United States Patent
Jayashankar

(10) Patent No.: US 8,021,713 B2
(45) Date of Patent: Sep. 20, 2011

(54) BIT-PATTERNED MAGNETIC MEDIA FORMED IN FILLER LAYER RECESSES

(75) Inventor: Sethuraman Jayashankar, Sewickley, PA (US)

(73) Assignee: Seagate Technology LLC, Cupertino, CA (US)

( * ) Notice: Subject to any disclaimer, the term of this patent is extended or adjusted under 35 U.S.C. 154(b) by 168 days.

(21) Appl. No.: 12/175,607

(22) Filed: Jul. 18, 2008

(65) Prior Publication Data

US 2010/0015471 A1    Jan. 21, 2010

(51) Int. Cl.
*G03F 7/20* (2006.01)

(52) U.S. Cl. ......................................... 427/130

(58) Field of Classification Search .................. 427/127, 427/131, 256
See application file for complete search history.

(56) References Cited

U.S. PATENT DOCUMENTS

| | | | |
|---|---|---|---|
| 6,217,970 B1 * | 4/2001 | Arita et al. | 428/848.1 |
| 6,525,902 B1 * | 2/2003 | Hu et al. | 360/125.42 |
| 6,723,198 B1 * | 4/2004 | Kurataka et al. | 156/232 |
| 6,964,793 B2 * | 11/2005 | Willson et al. | 427/466 |
| 7,141,317 B2 | 11/2006 | Kikitsu et al. | 428/829 |
| 2004/0190201 A1 * | 9/2004 | Fujita et al. | 360/135 |
| 2006/0141141 A1 | 6/2006 | Kamata et al. | 427/128 |
| 2006/0172153 A1 | 8/2006 | Kikitsu et al. | 428/826 |
| 2006/0196844 A1 | 9/2006 | Albrecht et al. | 216/22 |
| 2006/0269795 A1 | 11/2006 | Yanagita et al. | 428/833 |
| 2007/0002481 A1 | 1/2007 | Kikitsu et al. | 360/48 |
| 2007/0015011 A1 | 1/2007 | Kikitsu et al. | 428/828.1 |
| 2007/0065588 A1 | 3/2007 | Kihara et al. | 427/355 |
| 2007/0217075 A1 | 9/2007 | Kamata et al. | 360/135 |
| 2007/0248843 A1 * | 10/2007 | Wu et al. | 428/827 |
| 2008/0037173 A1 | 2/2008 | Saito et al. | 360/135 |
| 2008/0093336 A1 * | 4/2008 | Lee et al. | 216/22 |

* cited by examiner

*Primary Examiner* — Timothy H Meeks
*Assistant Examiner* — Tabassom Tadayyon Eslami
(74) *Attorney, Agent, or Firm* — Alan G. Rego; Westman, Champlin & Kelly, P.A.

(57) ABSTRACT

A recessed field is formed surrounding resist columns that are in a pattern of bit patterned magnetic media. A filler layer is formed in the recessed field. The resist columns are removed to leave recesses in the filler layer that replicate the pattern. Bit patterned magnetic media is formed in the recesses.

17 Claims, 7 Drawing Sheets

US 8,021,713 B2

BIT-PATTERNED MAGNETIC MEDIA FORMED IN FILLER LAYER RECESSES

FIELD OF THE INVENTION

The present invention relates generally to bit patterned magnetic data storage media, and more particularly but not by limitation to providing bit patterns for such media.

BACKGROUND OF THE INVENTION

Bit patterned recording media comprises an array of magnetic islands that are spaced apart from one another on a media surface. The spaces between the patterned islands are filled with a non-media material to provide a smooth surface for the read/write head to fly over. The non-media material separates the magnetic islands from one another. The magnetic islands can be round, oval or another shape. A bit of data is recorded on one or more of the islands. In known bit patterned recording media, a filler material is provided, pits or cavities are then provided in the filler material by etching or by using a stamper, and then magnetic recording material is deposited in the pits or cavities. The process of providing the pits or cavities by stamping or etching is complex, expensive and difficult to control.

Embodiments of the present invention provide solutions to these and other problems, and offer other advantages over the prior art.

SUMMARY OF THE INVENTION

In a process described below, a recessed field is formed surrounding resist columns. The resist columns are in a pattern of bit patterned magnetic media. A filler layer is formed in the recessed field. The resist columns are removed to leave recesses in the filler layer. The recesses in the filler layer replicate the pattern. Bit patterned magnetic media is formed in the recesses.

According to one aspect, the filler material comprises spun on glass (SOG) that is heated to convert the spun on glass to silicon dioxide. According to another aspect, a release monolayer is provided on upper surfaces of the resist columns to resist wetting by the spun on glass.

According to yet another aspect, the bit patterned magnetic media is formed on a seed layer.

Other features and benefits that characterize embodiments of the present invention will be apparent upon reading the following detailed description and review of the associated drawings.

DETAILED DESCRIPTION OF ILLUSTRATIVE EMBODIMENTS

In the process described in FIGS. 2-7A, B below, a substrate is provided. A seed layer is disposed on the substrate, and a resist layer is shaped to form resist columns. A recessed field is formed surrounding the resist columns. The resist columns are in a pattern of bit patterned magnetic media. A filler layer is formed in the recessed field. The resist columns are removed to leave recesses in the filler layer. The recesses in the filler layer replicate the pattern of bit patterned magnetic media. Bit patterned magnetic media is formed in the recesses.

According to one aspect, the filler material comprises spun on glass (SOG) that is later heated to convert the spun on glass to silicon dioxide. According to another aspect, a release monolayer is provided on upper surfaces of the resist columns to resist wetting by the spun on glass on top of the resist layer. According to yet another aspect, the bit patterned magnetic media is formed on a seed layer. A resulting storage media disc includes bit patterned media dots (also called bits or islands) that are formed in recesses that have not been formed by etching or stamping. The recesses have well defined, controlled shapes and sizes that are easily and economically formed. The undesired variabilities of stamping or etching recesses are avoided.

Figure 1:
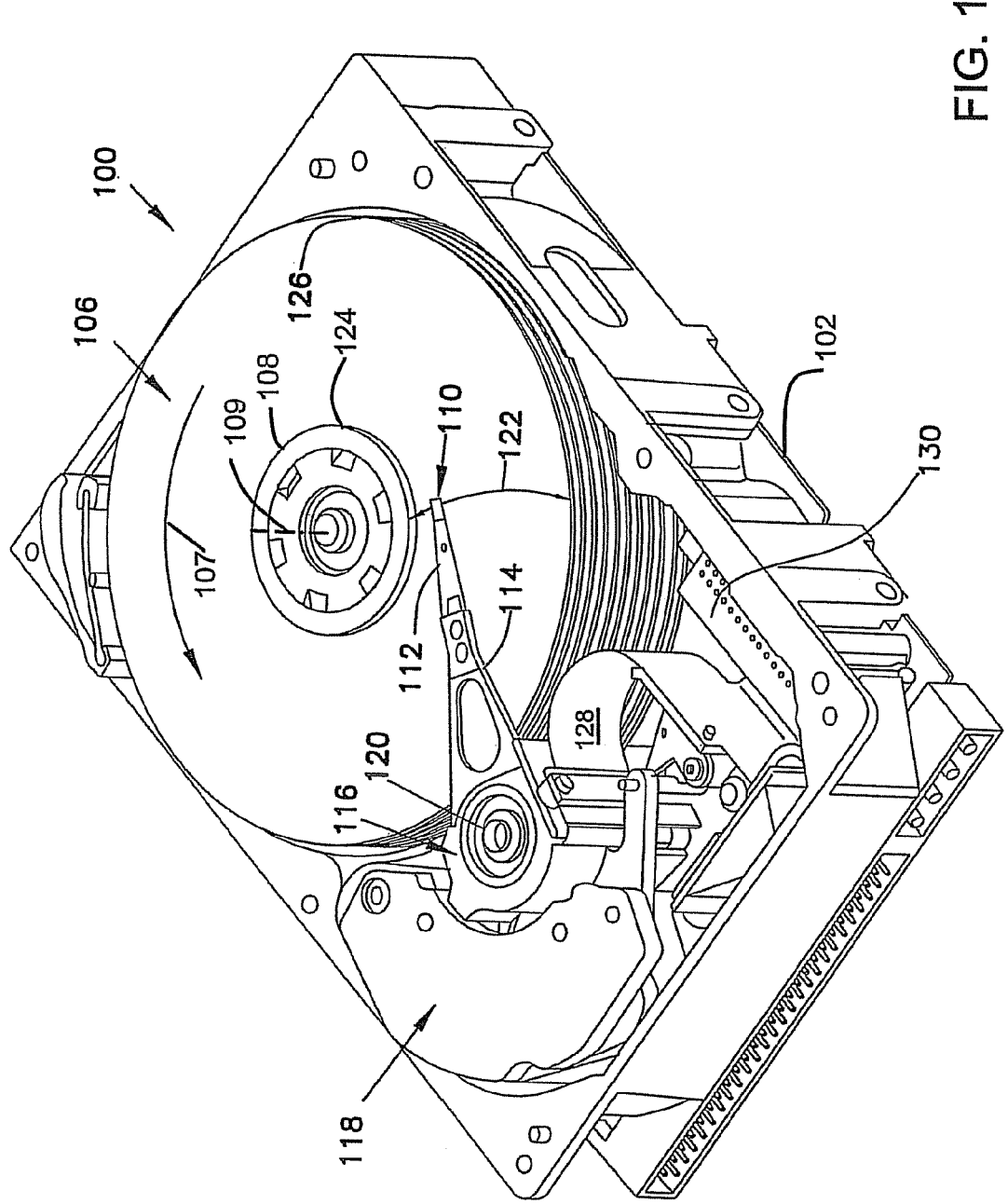
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about central axis 109. The individual discs in the disc pack 106 comprise bit patterned media discs, which are described in more detail below in connection with FIGS. 2-7A, B. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
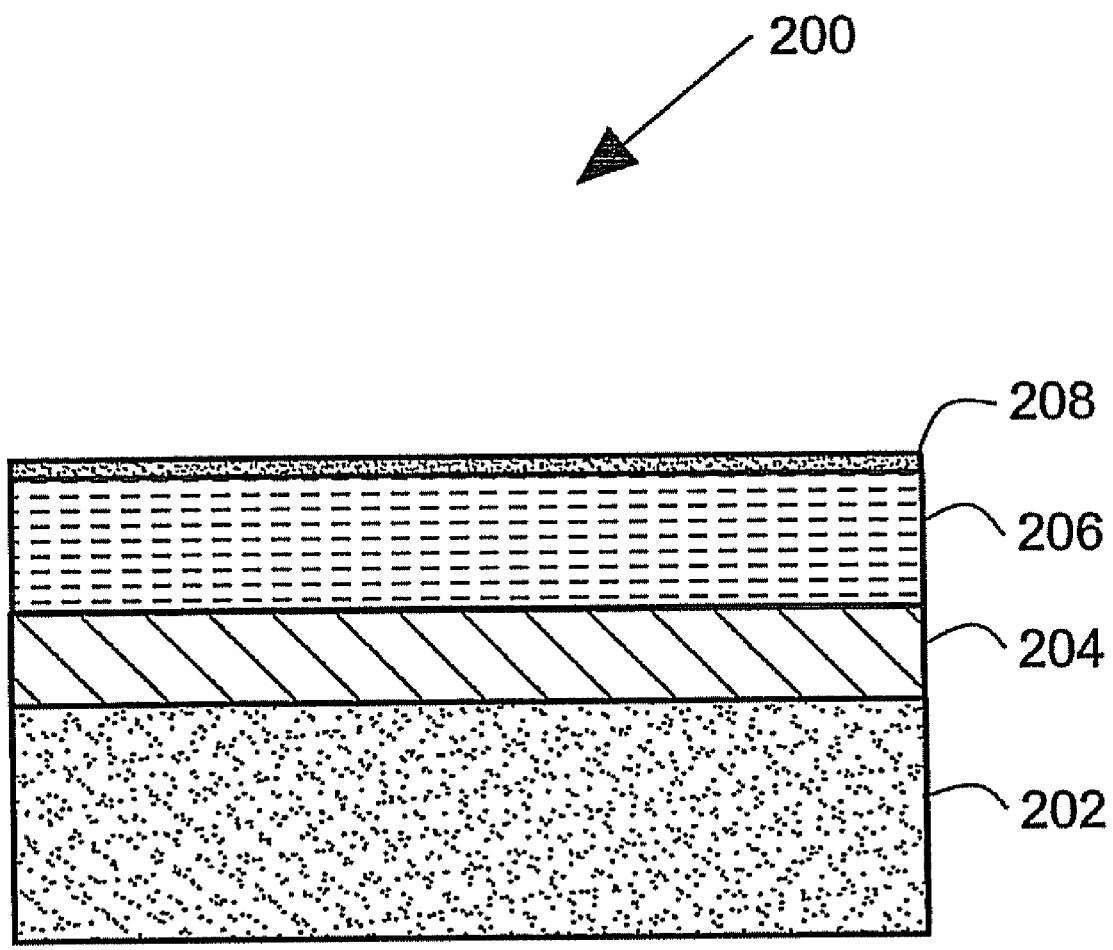
FIG. 2 illustrates a cross-sectional view of a portion of a disc at a first process step in manufacturing of a storage media disc.
Figure 6A:
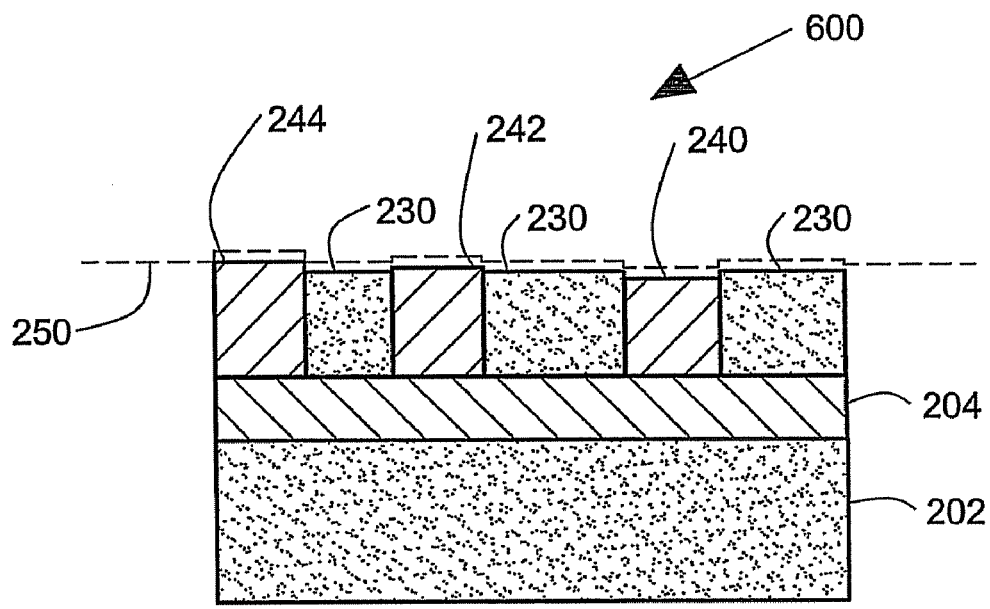
FIGS. 6A, 6B illustrate a portion of a disc at a fifth process step in manufacturing of the storage media disc.
Figure 6B:
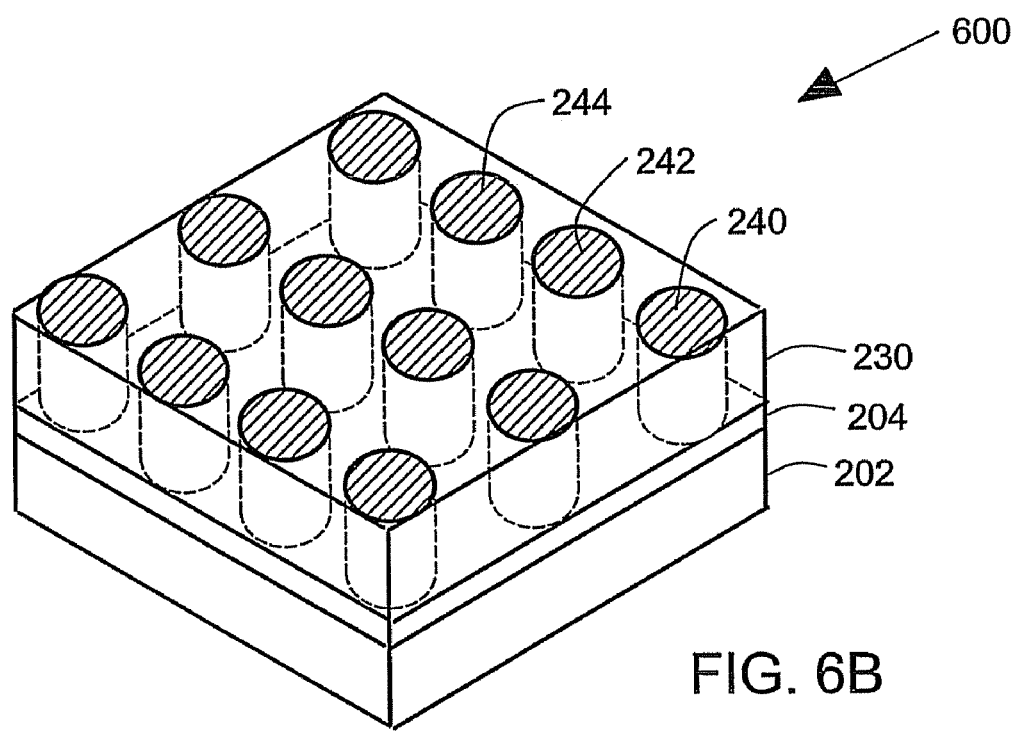

FIG. 2 illustrates a cross-sectional view of a portion of a disc 200 at a first process step in manufacturing of a storage media disc 600 (FIGS. 6A, 6B). The disc 200 comprises a substrate 202. The substrate 202 provides mechanical support for subsequent layers formed in place on the substrate 202.

A seed layer 204 is disposed on the substrate 202. The seed layer 204 comprises a metal surface upon which a growth of a subsequent magnetic media layer 240, 242, 244 (FIGS. 6A, 6B) can be initiated.

An undeveloped photoresist layer 206 is disposed on the seed layer 204. The undeveloped photoresist layer 206 comprises a photosensitive resist material. The undeveloped photoresist layer 206 can be spun on, vapor coated, or deposited by other known means of application of photoresists.

According to one aspect, a release monolayer 208 is disposed on the undeveloped photoresist layer 206. The release monolayer 208 resists adhesion of a filler layer 230 (FIGS.

4A, 4B) to a top surface of the photoresist layer 206 as described in more detail below in connection with FIGS. 4A, 4B. The release monolayer 208 provides the desired surface interface characteristics for controlling deposition of the filler layer 230. The release monolayer 208 is typically only one molecule thick and does not interfere with subsequent exposure of the undeveloped photoresist layer 206 and is present after the photoresist is subsequently developed.

While the release monolayer 208 is shown in place in FIG. 2, it will be understood that the release monolayer 208 can be alternatively applied at other steps in the process sequence. For example, it can be applied after completion of steps shown in FIGS. 4A, 4B and before completion of steps shown in FIGS. 5A, 5B.

According to one aspect, the substrate 202 comprises aluminum alloy, magnesium alloy, glass, ceramic, glass-ceramic composite, or polymeric material. The surface of the substrate 202 can be modified or coated to improve surface characteristics for receiving the seed layer 204.

According to one aspect the seed layer 204 comprises a metal, a metal alloy or an electrically conductive oxide. According to another aspect, the seed layer can comprise a magnetic material and can function as a magnetic soft underlayer (SUL) in the storage media disc 600 (FIGS. 6A, 6B). According to one aspect, the seed layer 204 is formed by vapor deposition. According to another aspect, the magnetic soft underlay comprises FeNi or permalloy. Other known magnetic soft underlayer materials can also be, for example, FeCoZrTa or FeCoB. The soft underlayer can be amorphous or crystalline.

Figure 3A:
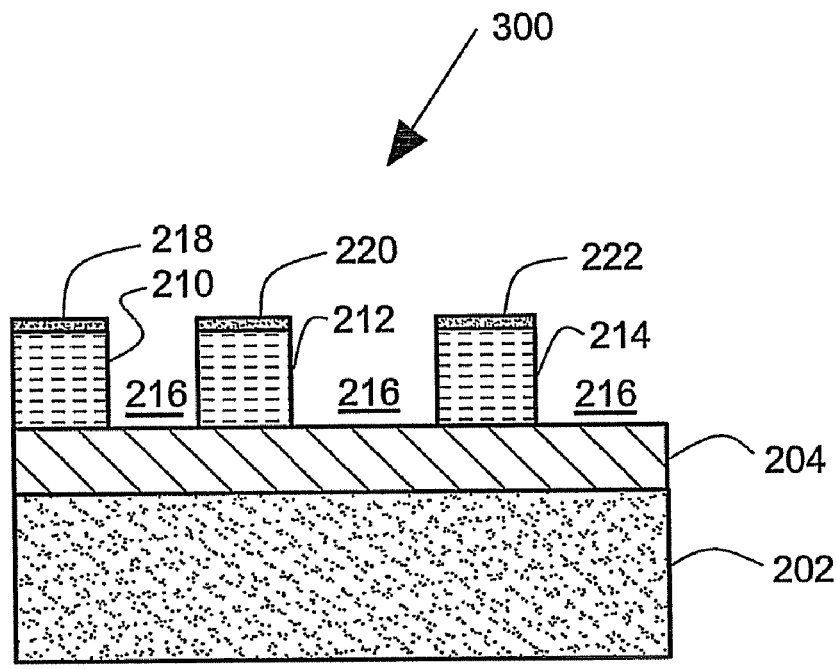
FIGS. 3A, 3B illustrate a portion of a disc at a second process step in manufacturing of the storage media disc.
Figure 3B:
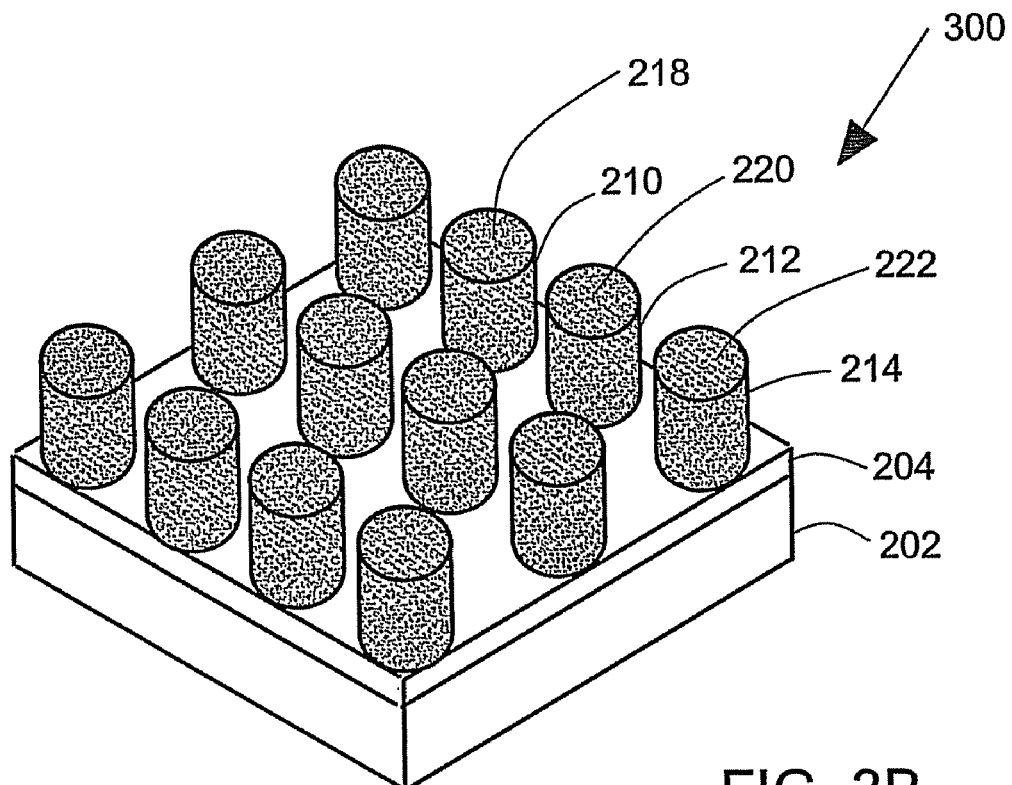

FIGS. 3A, 3B illustrate a portion of a disc 300 at a second process step in manufacturing of the storage media disc 600 (FIGS. 6A, 6B). In FIGS. 3A, 3B, a pattern of developed photoresist columns 210, 212, 214 are present in a recessed field 216 that surrounds the photoresist columns 210, 212, 214. The photoresist columns 210, 212, 214 (also called resist columns) are arranged in a pattern of bit patterned magnetic media. The undeveloped photoresist layer 206 (FIGS. 2A, 2B) has been photolithographically exposed to a pattern of radiation that defines the shape of the columns 210, 212, 214 and the recess field 216. The exposed photoresist layer has been photolithographically developed (etched, removed, developed away) to remove photoresist material in the recessed field 216, leaving the developed photoresist columns 210, 212, 214. According to one aspect, top surfaces of the photoresist columns 210, 212, 214 are covered with release monolayer caps 218, 220, 222 formed from the release monolayer 208 (FIGS. 2A, 2B). A positive or negative photolithographic exposure can be used, depending on whether the photoresist is a positive or negative type of photoresist material. Photolithographic exposure can be accomplished using a mask, a scanning energy beam, nanopatterning or other known methods of photolithographic exposure.

Figure 4A:
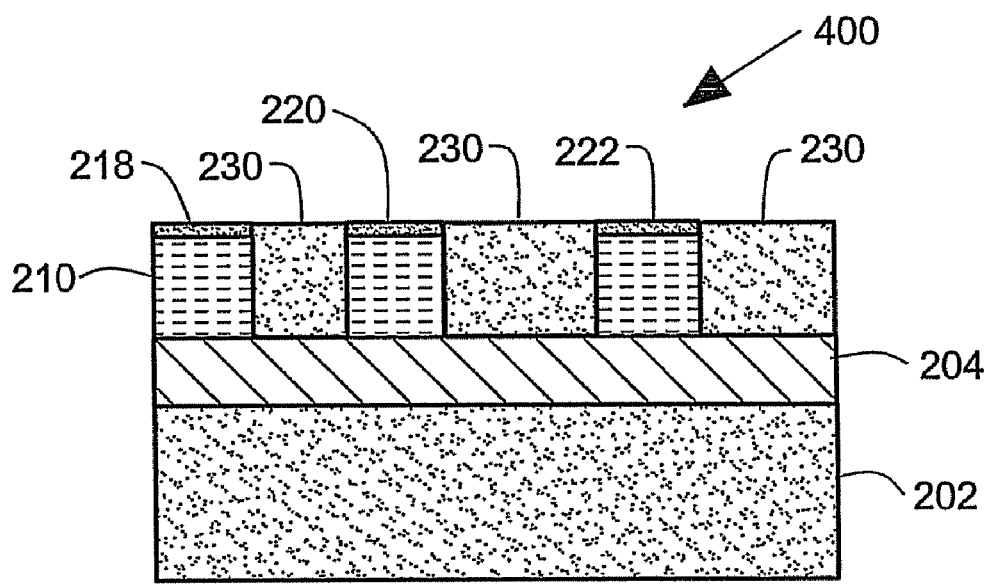
FIGS. 4A, 4B illustrate a portion of a disc at a third process step in manufacturing of the storage media disc.
Figure 4B:
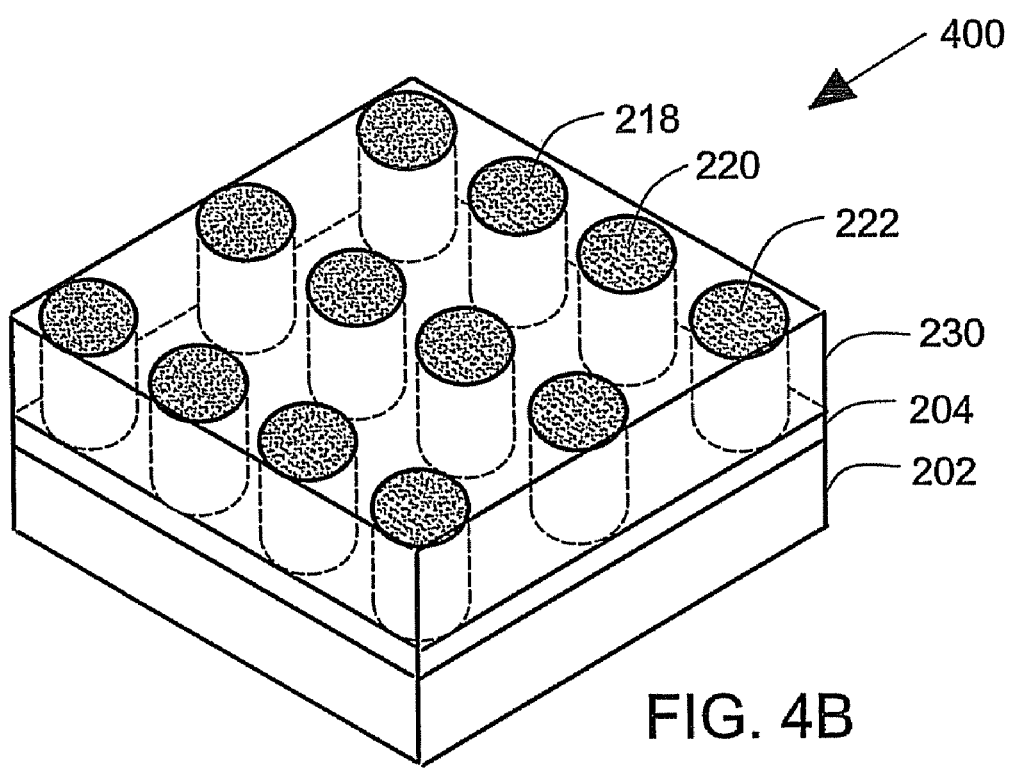

FIGS. 4A, 4B illustrate a portion of a disc 400 at a third process step in manufacturing of the storage media disc 600 (FIGS. 6A, 6B). In FIGS. 4A, 4B, a filler layer 230 has been applied in the recessed field 216. The filler layer 230 is formed in the recessed field 216 at a time when magnetic media is not yet formed on the disc 400. The filler layer 230 is not used as an etching mask. According to one aspect, the monolayer caps 218, 220, 222 resist wetting and adhesion by the filler layer 230. Upper surfaces of the monolayer caps 216, 218, 220 remain relatively free of filler layer 230.

According to one aspect, the filler layer 230 comprises spun-on-glass (SOG). The filler layer 230 is applied without the use of a stamper on the filler layer 230. A stamper is not needed because a pattern of photoresist columns 210, 212, 214 are present when the filler layer 230 is applied, and the pattern of photoresist columns 210, 212, 214 function to pattern the filler layer 230 only in the recessed field 216. The filler layer is excluded from the pattern of photoresist columns 210, 212, 214.

Figure 5A:
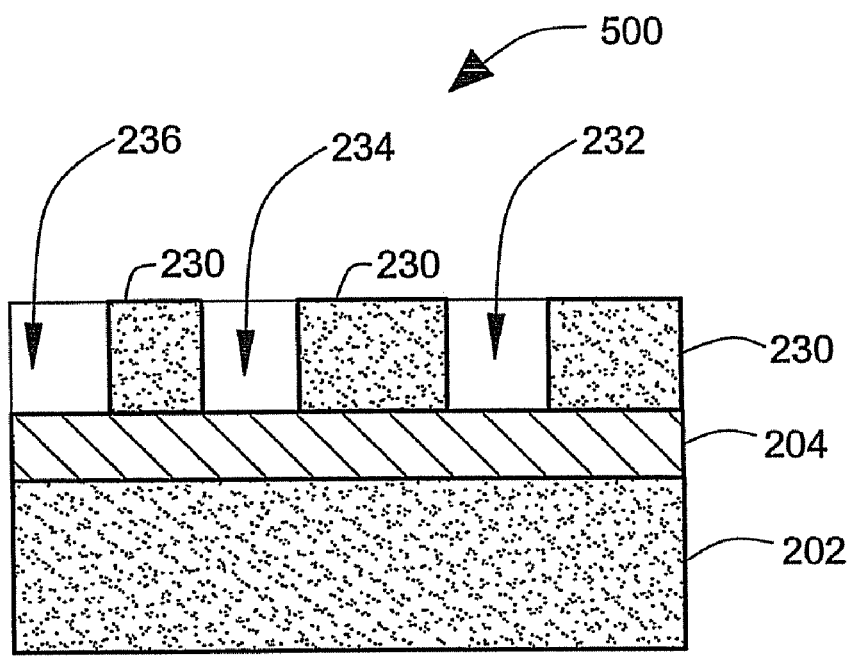
FIGS. 5A, 5B illustrate a portion of a disc at a fourth process step in manufacturing of the storage media disc.
Figure 5B:
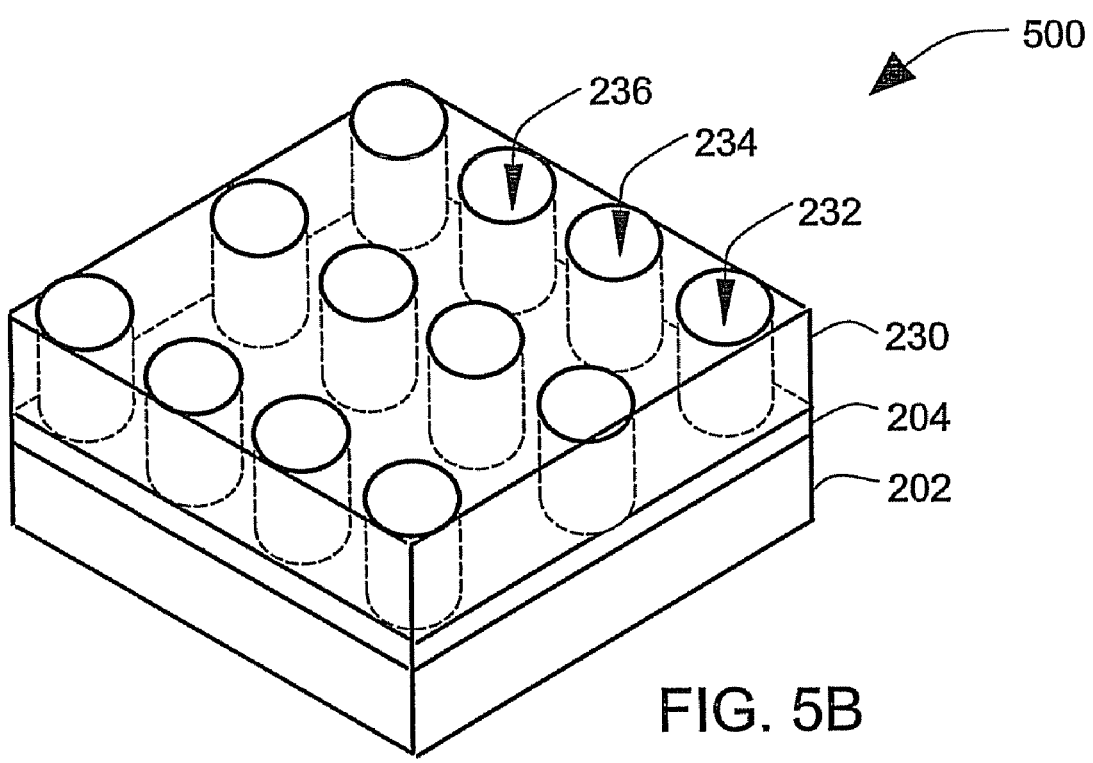

FIGS. 5A, 5B illustrate a portion of a disc 500 at a fourth process step in manufacturing of the storage media disc 600 (FIGS. 6A, 6B). In FIGS. 5A, 5B, the monolayer caps 218, 220, 222 and the photoresist columns 210, 212, 214 have been removed, leaving behind the filler layer 230. The filler layer 230 surrounds recesses 232, 234, 236 formed in the filler layer that replicate the desired pattern of bit patterned magnetic media. According to one aspect, the monolayer caps 218, 220, 222 and the photoresist columns 210, 212, 214 are removed using an ash and strip process. According to another aspect, the ash and strip process oxidizes the filler layer 230. According to one aspect, the filler layer 230 comprises spun-on-glass, and the ash and strip process heats the spun-on-glass and converts the spun-on-glass to silicon dioxide. Alternatively, the spun-on-glass can be converted to its final form by curing with radiation of appropriate wavelength, dosage and time.

FIGS. 6A, 6B illustrate a portion of a disc 600 at a fifth process step in manufacturing of the storage media disc. In FIGS. 6A, 6B, magnetic recording media material 240, 242, 244 is disposed in the recesses 232, 234, 236 (FIGS. 5A, 5B). The magnetic recording media material 240, 242, 244 arranged in the pattern of the recesses 232, 234, 236 comprises bit patterned magnetic media. According to one aspect, the recording media material 240, 242, 244 is grown on the seed layer 204. As illustrated in FIG. 6, the recording media material 240, 242, 244 and the filler layer 230 form an upper surface 250. In some applications, the upper surface 250 may be sufficiently smooth for flying a transducer head over the upper surface 250. In other applications, the upper surface 250 may not be sufficiently smooth for flying a transducer head, and the disc 600 can be optionally further processed as illustrated in FIGS. 7A, 7B.

According to one aspect, the magnetic recording media material 240, 242, 244 is formed by electroless deposition. According to another aspect the magnetic recording media material 240, 242, 244 is formed by electrodeposition. Other known means of depositing magnetic recording media material in recesses are also contemplated. The magnetic recording media material 240, 242, 244 comprises CoCrPt, FePt, CoCrPtB, CoPtP, FePtP, CoSm or other known magnetic recording media material. The magnetic media material can be a single material, or it can be a multilayer stack comprising multiple different recording media elements.

Figure 7A:
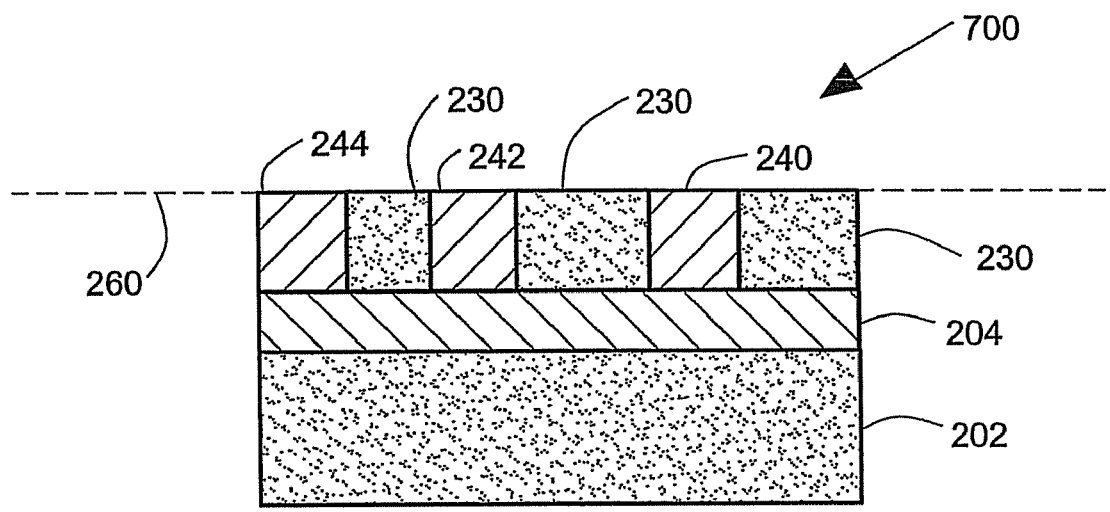
FIGS. 7A, 7B illustrate a portion of a disc at an optional sixth process step in manufacturing of the storage media disc.
Figure 7B:
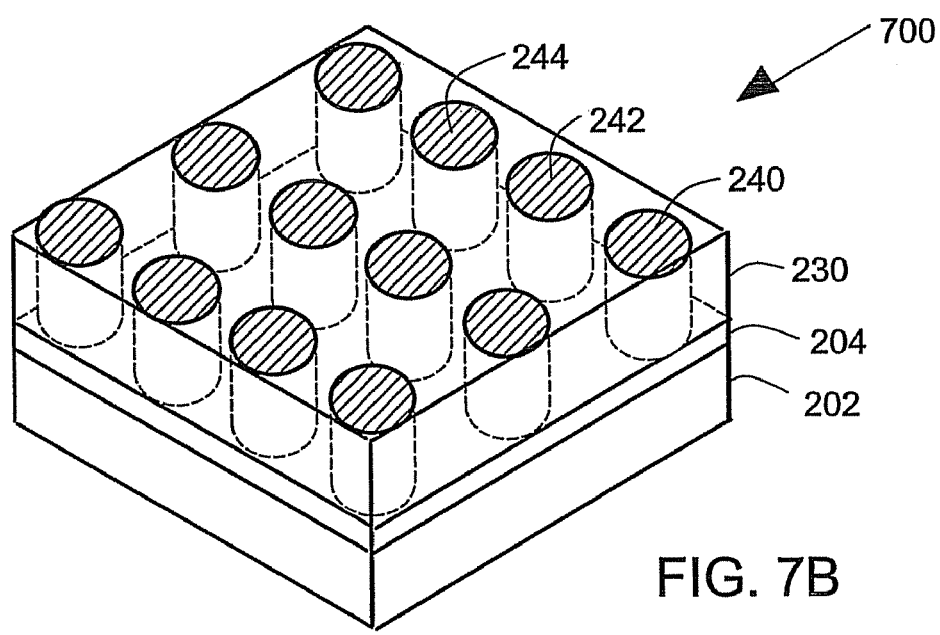

FIGS. 7A, 7B illustrate a portion of a disc 700 at an optional sixth process step in manufacturing of the storage media disc. In FIGS. 7A, 7B, an upper surface 250 has been planarized to provide a smooth, flat surface planarized surface 260 for flying a transducer head over the planarized surface 260. Both the magnetic recording media material 240, 242, 244 and the filler layer 230 are planarized. According to one aspect, the planarizing is accomplished using a chemical mechanical polishing (CMP) process to planarize the upper surface to a flattened plane 260. Other planarization processes such as electro-chemical mechanical planarization (ECMP), gas cluster ion beam etch (GCIBE), low angle ion beam etch can also be used.

Subsequent to completion of manufacture of either disc 600 or disc 700, additional optional layers can be applied to the upper surface to improve corrosion resistance, tribology, or flyability characteristics of the upper surface. According to one aspect, diamond-like carbon (DLC) coating is applied to the upper surface. Discs 600 and 700 comprise bit patterned magnetic media discs.

It is to be understood that even though numerous characteristics and advantages of various aspects of the invention have been set forth in the foregoing description, together with details of the structure and function of various aspects of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the bit patterned media while maintaining substantially the same functionality without departing from the scope and spirit of the present invention. In addition, although the preferred aspects described herein is directed to a disk drive system for bit patterned magnetic data storage, it will be appreciated by those skilled in the art that the teachings of the present invention can be applied to other bit patterned magnetic media, without departing from the scope and spirit of the present invention. It is also to be understood that the same process as described in steps 1 through 6 as described above can be repeated numerous times to obtain a multilayered planar structure of bit-patterned media in a matrix of filler material. Furthermore, the recording media materials and filler materials can be varied from layer to layer in the multilayer planar structure.

What is claimed is:

1. A process, comprising:
   forming a recessed field surrounding resist columns that are in a pattern of bit patterned magnetic media;
   forming a release monolayer on top of the resist columns and not in the recessed field surrounding the resist columns;
   forming a filler layer in the recessed field, wherein the release monolayer comprises a material that resists wetting by a material of the filler layer;
   removing the resist columns to leave recesses in the filler layer that replicate the pattern; and
   forming bit patterned magnetic media in the recesses.

2. The process of claim 1 wherein the filler layer is formed in the recessed field at a time when the magnetic media is not yet formed.

3. The process of claim 1, comprising:
   applying spin-on-glass in the recessed field; and
   forming the filler layer by heating the spin-on-glass to form silicon dioxide.

4. The process of claim 1, comprising:
   planarizing exposed surfaces of the magnetic media and the filler layer.

5. The process of claim 1 wherein the forming of the recessed field comprises photolithographic etching of a resist layer.

6. The process of claim 1 where the forming of the resist columns comprises nanopatterning.

7. The process of claim 1 wherein the pattern is formed without the use of a stamper.

8. The process of claim 1 wherein the filler layer is not used as an etching mask.

9. The process of claim 1, comprising:
   forming the resist columns photolithographically.

10. The process of claim 1, comprising:
    forming the resist columns on a seed layer.

11. The process of claim 10, comprising:
    forming the seed layer on a substrate.

12. A process, comprising:
    providing a disc substrate;
    providing a seed layer disposed on the disc substrate;
    providing a resist layer disposed on the seed layer;
    photolithographically shaping the resist layer to provide a recessed field surrounding resist columns that are in a pattern of bit patterned magnetic media;
    forming a filler layer in the recessed field;
    removing the resist columns to leave recesses in the filler layer that replicate the pattern; and
    forming bit patterned magnetic media in the recesses by disposing magnetic recording media material in the recesses to form an upper surface that is, without planarization processing, sufficiently smooth for flying a transducer head over the upper surface.

13. The process of claim 12 and forming the seed layer of a magnetic material such that the seed layer functions as a magnetic soft underlayer.

14. The process of claim 12 wherein the forming of the bit patterned magnetic media comprises electroless plating.

15. The process of claim 12 wherein the forming of the bit patterned magnetic media comprises electroplating.

16. The process of claim 12 wherein the removing of the resist columns includes an ash and strip process.

17. The process of claim 16 wherein the filler layer comprises spun on glass that is converted in the ash and strip process to silicon dioxide.

* * * * *